United States Patent
Fan et al.

(10) Patent No.: US 12,038,408 B2
(45) Date of Patent: Jul. 16, 2024

(54) INTEGRATED MICRO-PHOTOIONIZATION DETECTOR WITH AN ULTRATHIN ULTRAVIOLET TRANSMISSION WINDOW

(71) Applicant: THE REGENTS OF THE UNIVERSITY OF MICHIGAN, Ann Arbor, MI (US)

(72) Inventors: Xudong Fan, Saline, MI (US); Hongbo Zhu, Johnson City, TN (US); Katsuo Kurabayashi, Ann Arbor, MI (US)

(73) Assignee: The Regents of The University of Michigan, Ann Arbor, MI (US)

(*) Notice: Subject to any disclaimer, the term of this patent is extended or adjusted under 35 U.S.C. 154(b) by 472 days.

(21) Appl. No.: 17/282,671

(22) PCT Filed: Oct. 2, 2019

(86) PCT No.: PCT/US2019/054292
§ 371 (c)(1),
(2) Date: Apr. 2, 2021

(87) PCT Pub. No.: WO2020/072644
PCT Pub. Date: Apr. 9, 2020

(65) Prior Publication Data
US 2021/0341422 A1    Nov. 4, 2021

Related U.S. Application Data
(60) Provisional application No. 62/740,583, filed on Oct. 3, 2018.

(51) Int. Cl.
*B01D 53/22*    (2006.01)
*G01N 27/64*    (2006.01)
(Continued)

(52) U.S. Cl.
CPC ........... *G01N 27/64* (2013.01); *G01N 30/463* (2013.01); *G01N 30/64* (2013.01)

(58) Field of Classification Search
CPC ....... G01N 30/64; G01N 27/64; G01N 30/463
See application file for complete search history.

(56) References Cited

U.S. PATENT DOCUMENTS 4,065,384 A * 12/1977 Pandey ................. B01D 15/08
                                                                        210/658
4,126,554 A * 11/1978 Rainin ................... G01N 30/92
                                                                        427/202
(Continued)

FOREIGN PATENT DOCUMENTS

CN         1503380 A      6/2004
CN       102168958 A      8/2011
(Continued)

OTHER PUBLICATIONS

First Examination Report for Indian Patent Application No. 202117017091 issued by the Indian Patent Office Aug. 4, 2022; 6 pages.

(Continued)

*Primary Examiner* — Anthony R Shumate
(74) *Attorney, Agent, or Firm* — Harness, Dickey & Pierce, P.L.C.

(57) ABSTRACT

An integrated microfluidic photoionization detector (PID) is provided including a microfluidic ionization chamber a microfluidic ultraviolet radiation chamber that is configured to generate ultraviolet photons. An ultrathin transmissive window is disposed between the microfluidic ionization chamber and the microfluidic ultraviolet radiation chamber that permits the ultraviolet photons to pass from the microfluidic ultraviolet radiation chamber into the microfluidic ionization chamber. Detection systems for one or more VOC analytes are also provided that include a gas chromatogra- (Continued)

phy (GC) unit including at least one gas chromatography column and an integrated microfluidic photoionization detector (PID) disposed downstream of the gas chromatography (GC) unit.

20 Claims, 3 Drawing Sheets

(51) Int. Cl.
*G01N 30/46* (2006.01)
*G01N 30/64* (2006.01)

(56) References Cited

U.S. PATENT DOCUMENTS

| | | | | |
|---|---|---|---|---|
| 4,243,887 A * | 1/1981 | Hillenkamp | ........... | G01N 27/64 250/423 P |
| 4,313,906 A * | 2/1982 | Filipi | ................. | G01N 30/92 210/198.3 |
| 4,394,263 A * | 7/1983 | Dosch | ................. | G01N 30/40 96/104 |
| 4,429,228 A | 1/1984 | Anderson | | |
| 4,591,524 A * | 5/1986 | Tyihak | ................. | G01N 30/94 428/167 |
| 4,615,989 A * | 10/1986 | Ritze | ...................... | C03C 3/19 501/78 |
| 5,152,177 A * | 10/1992 | Buck | .................... | E21B 47/00 166/310 |
| 6,429,426 B1 * | 8/2002 | Doring | ................ | G01N 27/64 250/288 |
| 6,727,499 B2 | 4/2004 | Zimmermann et al. | | |
| 8,829,459 B2 | 9/2014 | Ichizawa et al. | | |
| 9,341,604 B2 | 5/2016 | Fan et al. | | |
| 10,705,061 B2 | 7/2020 | Fan et al. | | |
| 2002/0187557 A1 | 12/2002 | Hobbs et al. | | |
| 2003/0094909 A1 * | 5/2003 | Hishinuma | ........... | C23C 16/482 315/248 |
| 2011/0124136 A1 * | 5/2011 | Hirayama | ................ | C09J 5/06 438/34 |
| 2013/0153762 A1 * | 6/2013 | Munchmeyer | .......... | H01J 49/10 250/288 |
| 2014/0047900 A1 * | 2/2014 | Amirav | ................ | G01N 30/60 73/23.39 |
| 2017/0082579 A1 * | 3/2017 | Sawada | ............. | G01N 33/6848 |
| 2017/0183259 A1 * | 6/2017 | Da | .......................... | C03C 3/093 |
| 2018/0003674 A1 | 1/2018 | Gentalen | | |
| 2018/0038850 A1 | 2/2018 | Wang et al. | | |
| 2018/0053643 A1 * | 2/2018 | Tachibana | ............ | G01N 27/623 |
| 2018/0059058 A1 | 3/2018 | Fan et al. | | |
| 2018/0095060 A1 | 4/2018 | Fan et al. | | |
| 2018/0164261 A1 | 6/2018 | Fan et al. | | |
| 2018/0265680 A1 * | 9/2018 | Parizat | ................... | C08K 5/527 |
| 2020/0381138 A1 * | 12/2020 | Itoh | ....................... | B22F 1/0545 |
| 2021/0341422 A1 * | 11/2021 | Fan | ...................... | G01N 30/463 |
| 2022/0098403 A1 * | 3/2022 | Vernon | .................. | B65D 81/30 |

FOREIGN PATENT DOCUMENTS

| | | |
|---|---|---|
| CN | 107735682 A | 2/2018 |
| EP | 1059530 A2 | 12/2000 |
| EP | 2784499 A1 | 10/2014 |
| JP | 2004502136 A | 1/2004 |
| JP | 2005509142 A | 4/2005 |
| JP | 2018515773 A | 6/2018 |
| KR | 10-2018-0003579 A | 1/2018 |
| RU | 2455633 C1 | 7/2012 |
| RU | 2523765 C1 | 7/2014 |
| WO | 2016179291 A1 | 11/2016 |

OTHER PUBLICATIONS

First Office Action for Russian Application No. 2021112132 issued Sep. 30, 2022; 14 pages.
First Examination Report for Saudi Arabia Patent Application No. 521421643 issued on Nov. 2, 2022, with correspondence from Abu-Ghazaleh Intellectual Property summarizing the Examination Report; 10 pages.
European Search Report for EP Application No. 19869117.2 issued Mar. 25, 2022; 9 pages.
International Search Report and Written Opinion of the International Searching Authority issued in PCT/US2019/054292, mailed Dec. 26, 2029; ISA/US.
First Office Action for Chinese Application No. 201980071744.3 issued Nov. 29, 2023; 12 pages.
Japanese Office Action regarding Patent Application No. 2021518585, dated Sep. 8, 2023.
Written Opinion issued Jul. 25, 2023 for Singapore Application No. 11202103423W; 7 pages.
Office Action issued Feb. 22, 2024, for Ukraine Application No. a202102243; 6 pages (English Summary Provided by Doubinsky & Osharova).
First Office Action for Korean Patent Application No. 10-2021-7013416, issued Mar. 9, 2024.
Second Office Action for Japanese Patent Application No. 2021518585, issued Mar. 5, 2024.
First Office Action for European Patent Application No. 19869117.2, issued May 3, 2024.

* cited by examiner

INTEGRATED MICRO-PHOTOIONIZATION DETECTOR WITH AN ULTRATHIN ULTRAVIOLET TRANSMISSION WINDOW

CROSS-REFERENCE TO RELATED APPLICATIONS

This application is the U.S. National Phase Application under 35 U.S.C. 371 of International Application No. PCT/US2019/054292 filed on Oct. 2, 2019, which claims the benefit of U.S. Provisional Application No. 62/740,583, filed on Oct. 3, 2018. The entire disclosures of the above applications are incorporated herein by reference.

GOVERNMENT SUPPORT

This invention was made with government support under RD-83564401-0 awarded by the United States Environmental Protection Agency. The Government has certain rights in the invention.

FIELD

The present disclosure relates to an integrated micro-photoionization detector with an ultrathin UV transmission window.

BACKGROUND

This section provides background information related to the present disclosure which is not necessarily prior art.

Gas chromatography (GC) is widely used for analysis of volatile organic compounds (VOCs) and other analyte compounds. When used for analysis, GC systems also typically include an analyte detector. Flame ionization detectors (FIDs) are commonly used vapor detectors for bench-top GC instruments. However, FIDs and μFIDs (micro-FIDs) are destructive and therefore of limited use. For example, FIDs and μFIDs cannot be placed in the middle of vapor flow path to monitor multi-dimensional GC separation. Instead, they can only be used at the terminal end of a GC instrument. Furthermore, FIDs require use of hydrogen, which hinders their broad acceptance in μGC devices. Thermal conductivity detectors (TCDs) and μTCDs (micro-TCDs) have also been used as a vapor detector in conjunction with GCs. They are non-destructive and have a flow-through design. However, TCDs suffer from low sensitivity (nano-gram) and require helium. Electron capture detectors (ECDs) are another type of non-destructive vapor detector. While they are very sensitive, they have a limited dynamic range and need to use radioactive materials for analyte ionization.

A photoionization detector (PID) is yet another type of vapor detector. PIDs are sensitive (pico-gram), non-destructive, and applicable to a wide range of vapors. In a PID, vapor molecules are ionized inside an ionization chamber by ultra-violet (UV) radiation generated by a UV lamp. Ions generated in the ionization chamber are then driven to electrodes to generate current. The UV lamp is typically filled with low pressure argon, krypton, or other gases to produce UV light under external electrical excitation. In the UV lamps, sealing windows (i.e., UV transmission windows) are formed with specialized materials, such as calcium fluoride, magnesium fluoride, or lithium fluoride. Such materials have a relatively high transmission coefficient within the range of wavelengths of UV radiation of interest. However, such materials are relatively expensive and susceptible to water etching, crystal solarization, and the yellowing effect due to UV damage, all of which degrade the UV lamp (and hence PID) performance and shorten its lifetime. In addition, such conventional UV lamps are not compatible with microfabrication processes. Consequently, it is difficult to microfabricate a PID using such conventional UV lamps.

SUMMARY

This section provides a general summary of the disclosure, and is not a comprehensive disclosure of its full scope or all of its features.

In certain aspects, the present disclosure provides an integrated microfluidic photoionization detector (PID) that comprises a microfluidic ionization chamber having an inlet that receives a fluid sample and an outlet through which the fluid sample exits the microfluidic ionization chamber. The integrated microfluidic PID also comprises a first electrode and a distinct second electrode in electrical communication with the microfluidic ionization chamber. A microfluidic ultraviolet radiation chamber is configured to generate ultraviolet photons. The integrated microfluidic PID also includes an ultrathin transmissive window disposed between the microfluidic ionization chamber and the microfluidic ultraviolet radiation chamber that permits the ultraviolet photons to pass from the microfluidic ultraviolet radiation chamber into the microfluidic ionization chamber. In certain variations, the ultrathin transmissive window that permits greater than or equal to about 5% of the ultraviolet photons to pass through.

In one aspect, the transmissive ultrathin window comprises a material selected from the group consisting of: silica, fused silica, quartz, sapphire, magnesium fluoride, calcium fluoride, lithium fluoride, and combinations thereof.

In one aspect, the transmissive ultrathin window is defined as one or more select regions on a plate.

In one aspect, the transmissive ultrathin window is disposed on a support plate and the transmissive ultrathin window is defined within select regions of the support plate.

In one aspect, the integrated microfluidic photoionization detector (PID) further comprises a stack of layers comprising a first layer and a second layer. The transmissive ultrathin window is defined within the first layer and one or more regions of the second layer corresponding to the transmissive ultrathin window are absent.

In one aspect, the transmissive ultrathin window has a thickness of less than or equal to about 20 μm and in configured to transmit greater than or equal to about 5% of the ultraviolet photons.

In one aspect, the transmissive ultrathin window has a thickness of greater than or equal to about 250 nm to less than or equal to about 500 nm.

In one aspect, the microfluidic ultraviolet radiation chamber has an inlet that receives an ultraviolet generating fluid.

In one aspect, the microfluidic ultraviolet radiation chamber comprises an ultraviolet generating fluid selected from the group consisting of: krypton, argon, helium, and combinations thereof.

In one aspect, the microfluidic ionization chamber is one or more microfluidic channels.

In one aspect, the one or more microfluidic channels have a total volume of less than about 10 μL.

In one aspect, the first electrode and the distinct second electrode are formed in a layer of electrically conductive material and the one or more microfluidic channels are disposed in the layer to electrically insulate the first electrode from the second distinct electrode.

In certain other aspects, the present disclosure provides a detection system for one or more VOC analytes comprising a gas chromatography (GC) unit that comprises at least one gas chromatography column and an integrated microfluidic photoionization detector (PID) disposed downstream of the gas chromatography (GC) unit. The integrated microfluidic photoionization detector (PID) comprises a microfluidic ionization chamber having an inlet that receives a fluid sample and an outlet through which the fluid sample exits the microfluidic ionization chamber. The integrated microfluidic photoionization detector (PID) also comprises a first electrode and a distinct second electrode in electrical communication with the microfluidic ionization chamber. The integrated microfluidic photoionization detector (PID) further comprises a microfluidic ultraviolet radiation chamber that is configured to generate ultraviolet photons. The integrated microfluidic photoionization detector (PID) also comprises a transmissive ultrathin window disposed between the microfluidic ionization chamber and the microfluidic ultraviolet radiation chamber that permits greater than or equal to about 5% of the ultraviolet photons the ultraviolet photons to pass from the microfluidic ultraviolet radiation chamber into the microfluidic ionization chamber. The microfluidic photoionization detector (PID) analyzes a sample processed in the gas chromatography (GC) unit.

In one aspect, the transmissive ultrathin window comprises a material selected from the group consisting of: silica, fused silica, quartz, sapphire, magnesium fluoride, calcium fluoride, lithium fluoride, and combinations thereof.

In one aspect, the transmissive ultrathin window is defined as one or more select regions on a plate.

In one aspect, the transmissive ultrathin window is disposed on a support plate and the transmissive ultrathin window is defined within select regions of the support plate.

In one aspect, the integrated microfluidic photoionization detector (PID) further comprises a stack of layers comprising a first layer and a second layer. The transmissive ultrathin window is defined within the first layer and one or more regions of the second layer corresponding to the transmissive ultrathin window are absent.

In one aspect, the transmissive ultrathin window has a thickness of less than or equal to about 20 μm and in configured to transmit greater than or equal to about 5% of the ultraviolet photons.

In one aspect, the microfluidic ionization chamber is one or more microfluidic channels.

In one aspect, the first electrode and the distinct second electrode are formed in a layer of electrically conductive material and the one or more microfluidic channels are disposed in the layer to electrically insulate the first electrode from the second distinct electrode.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
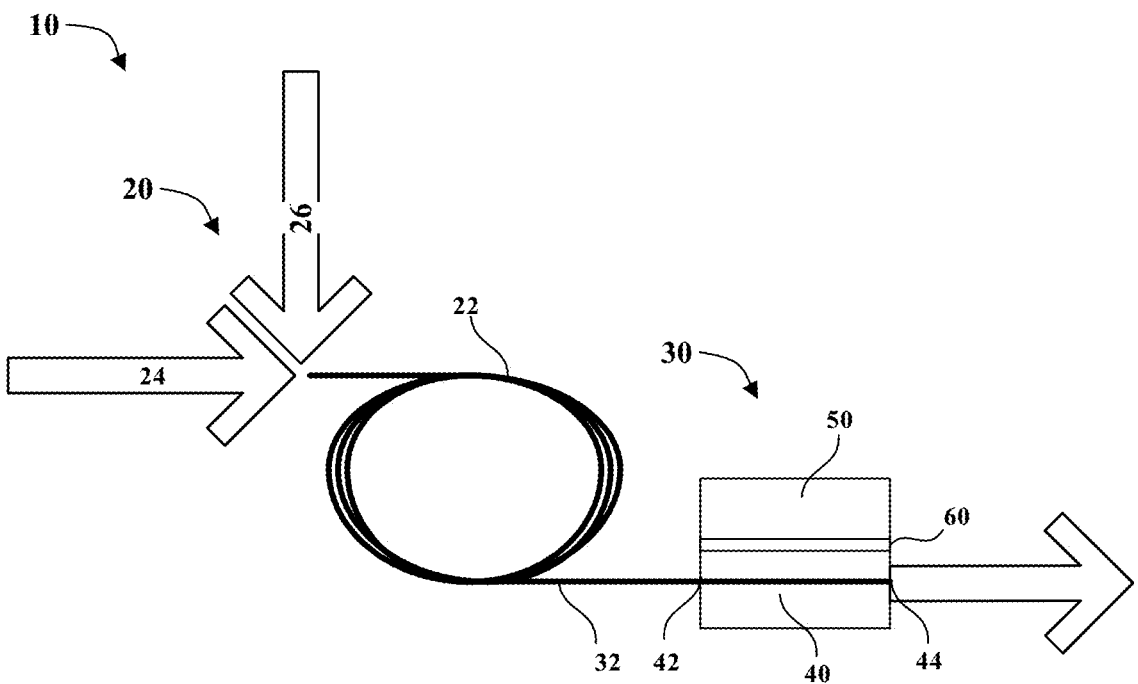
FIG. 1 shows a schematic of an example a detection system including a gas chromatography (GC) unit that comprises at least one gas chromatography column and an integrated microfluidic photoionization detector (PID) disposed downstream of the gas chromatography (GC) unit.

Example embodiments are provided so that this disclosure will be thorough, and will fully convey the scope to those who are skilled in the art. Numerous specific details are set forth such as examples of specific compositions, components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, elements, compositions, steps, integers, operations, and/or components, but do not preclude the presence or addition of one or more other features, integers, steps, operations, elements, components, and/or groups thereof. Although the open-ended term "comprising," is to be understood as a non-restrictive term used to describe and claim various embodiments set forth herein, in certain aspects, the term may alternatively be understood to instead be a more limiting and restrictive term, such as "consisting of" or "consisting essentially of." Thus, for any given embodiment reciting compositions, materials, components, elements, features, integers, operations, and/or process steps, the present disclosure also specifically includes embodiments consisting of, or consisting essentially of, such recited compositions, materials, components, elements, features, integers, operations, and/or process steps. In the case of "consisting of," the alternative embodiment excludes any additional compositions, materials, components, elements, features, integers, operations, and/or process steps, while in the case of "consisting essentially of," any additional compositions, materials, components, elements, features, integers, operations, and/or process steps that materially affect the basic and novel characteristics are excluded from such an embodiment, but any compositions, materials, components, elements, features, integers, operations, and/or process steps that do not materially affect the basic and novel characteristics can be included in the embodiment.

Any method steps, processes, and operations described herein are not to be construed as necessarily requiring their performance in the particular order discussed or illustrated, unless specifically identified as an order of performance. It is also to be understood that additional or alternative steps may be employed, unless otherwise indicated.

When a component, element, or layer is referred to as being "on," "engaged to," "connected to," or "coupled to" another element or layer, it may be directly on, engaged, connected or coupled to the other component, element, or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various steps, elements, components, regions, layers and/or sections, these steps, elements, components, regions, layers and/or sections should not be limited by these terms, unless otherwise indicated. These terms may be only used to distinguish one step, element, component, region, layer or section from another step, element, component, region, layer or section. Terms such as "first," "second," and other numerical terms when used herein do not imply a sequence or order unless clearly indicated by the context. Thus, a first step, element, component, region, layer or section discussed below could be termed a second step, element, component, region, layer or section without departing from the teachings of the example embodiments.

Spatially or temporally relative terms, such as "before," "after," "inner," "outer," "beneath," "below," "lower," "above," "upper," and the like, may be used herein for ease of description to describe one element or feature's relationship to another element(s) or feature(s) as illustrated in the figures. Spatially or temporally relative terms may be intended to encompass different orientations of the device or system in use or operation in addition to the orientation depicted in the figures.

Throughout this disclosure, the numerical values represent approximate measures or limits to ranges to encompass minor deviations from the given values and embodiments having about the value mentioned as well as those having exactly the value mentioned. Other than in the working examples provided at the end of the detailed description, all numerical values of parameters (e.g., of quantities or conditions) in this specification, including the appended claims, are to be understood as being modified in all instances by the term "about" whether or not "about" actually appears before the numerical value. "About" indicates that the stated numerical value allows some slight imprecision (with some approach to exactness in the value; approximately or reasonably close to the value; nearly). If the imprecision provided by "about" is not otherwise understood in the art with this ordinary meaning, then "about" as used herein indicates at least variations that may arise from ordinary methods of measuring and using such parameters. For example, "about" may comprise a variation of less than or equal to 5%, optionally less than or equal to 4%, optionally less than or equal to 3%, optionally less than or equal to 2%, optionally less than or equal to 1%, optionally less than or equal to 0.5%, and in certain aspects, optionally less than or equal to 0.1%.

In addition, disclosure of ranges includes disclosure of all values and further divided ranges within the entire range, including endpoints and sub-ranges given for the ranges.

Example embodiments will now be described more fully with reference to the accompanying drawings.

Detection systems using gas chromatography can be used to detect the presence of specific analyte compounds, such as VOCs or other compounds. In such systems, a vapor detector in the form of a microfluidic PID like those prepared in accordance with certain aspects of the present teachings is used in conjunction with a gas chromatography (GC) column. A vapor sample to be analyzed is first introduced to a GC column. In certain aspects, the GC column may be miniaturized as a micro-GC (µGC). The sample is then transported through the column by an inert gas carrier and the sample is separated within the GC column according to physical properties of each compound (analyte) in the sample. Each eluted compound emerges from the GC column and enters a vapor detector unit, which may be a photoionization detector (PID) or microfluidic PID (µPID), as described below. In other designs, the PID or µPID vapor detector unit(s) may be used in intermediate positions within the GC column for detection of analytes. As discussed herein, unless otherwise specified, PID and µPID are used interchangeably.

PIDs typically use high-energy photons (e.g., in the ultraviolet (UV) wavelength range) to dissociate the eluted analyte molecules into positively charged ions. Often the PID uses a discharge gas, such as an inert gas (such as krypton and argon) that is ionized in a discharge lamp chamber. External energy (such as RF energy) may be absorbed by the discharge gas so that the atoms in the discharge gas transition to an exited state. In the discharge chamber of the UV lamp, each ion can combine with another atom to emit one or more photons. Eluted compounds enter the PID device in an ionization chamber. The ionization chamber and discharge lamp chamber are typically separated from one another via an optically transparent window, which allows the high-energy photons to pass into the ionization chamber. A typical transmission window is formed of a material like magnesium fluoride, calcium fluoride, or lithium fluoride and has a thickness of about 0.1 mm (about 100 µm) to about 10 mm. The ionization chamber containing the eluted compounds is then bombarded by the photons generated by the ionized discharge gas from the discharge lamp chamber.

The photons/energy is then absorbed by the analyte molecules that transition to an exited state and ionize in the separate ionization chamber, ultimately forming positively charged ions. Thus, based on relative retention time in the GC column, different analyte molecules in the sample are separated, elute at different times, and then enter the chamber, where they become ionized from photons emitted from the ionized discharge gas.

The gas thus becomes electrically charged and the ions produce an electric current, which becomes an output related to concentration of the analyte molecules ionized. As each ionized compound passes one or more collecting electrodes adjacent to the ionizing chamber, an electrical current is generated. In this manner, analyte compounds can be identified based on their retention times and quantified by the PID signal (or the current PID generates).

In various aspects, the present disclosure contemplates an integrated photoionization detector (PID), which in certain variations, may be a microfluidic PID (µPID), as discussed further below. The µPID comprises a microfluidic ionization chamber for receiving and processing a fluid sample. A first electrode and a distinct second electrode are in electrical communication with the microfluidic ionization chamber. The µPID also comprises an integrated microfluidic ultraviolet radiation chamber that is configured to generate ultraviolet photons. A transmissive ultrathin window is disposed between the microfluidic ionization chamber and the microfluidic ultraviolet radiation chamber, which permits the ultraviolet photons to pass from the microfluidic ultraviolet radiation chamber into the microfluidic ionization chamber.

The present disclosure provides in certain aspects a detection system 20 for one or more volatile organic compound (VOC) or other target analytes, such as that shown in FIG. 1. In the detection system 10, a gas chromatography (GC) unit 20 comprises at least one gas chromatography column 22. The use of the term "column" is intended to broadly include various flow paths through which fluids may flow, such as a patterned flow field from micro-features defined in one or more substrates or other fluid flow paths recognized by those of skill in the art. An integrated microfluidic photoionization detector (µPID) 30 is disposed downstream of the gas chromatography (GC) unit 20.

In certain aspects, the GC unit 20 is a microfluidic GC (µGC) and the PID 30 is microfluidic PID (µPID). In various aspects, the disclosure provides methods of forming and devices having features or channels that are on a microscale and therefore are microfluidic. In some aspects, a feature, such as a channel or chamber is optionally smaller than a microscale, such as a nanoscale structure. As used herein, "microscale" refers to a structure having at least one dimension that is less than about 500 µm, optionally less than about 400 µm, optionally less than about 300 µm, optionally less than about 200 µm, optionally less than about 150 µm, and in certain variations, optionally less than about 100 µm. A "nanoscale" structure has at least one dimension that is less than or equal to about 50 µm, optionally less than or equal to about 10 µm (10,000 nm), optionally less than or equal to about 1 µm (1,000 nm), optionally less than or equal to about 0.1 µm (100 nm), optionally less than about 50 nm, and optionally less than about 10 nm. As used herein, reference to a microscale, microchannel, microfluidic channel, or microstructure, encompasses smaller structures, such as the equivalent nanoscale structures.

A microfluidic channel is a microchannel formed in or on a substrate that has a cross-sectional area and volume sufficient to permit the microfluidic channel to receive, transfer, and/or store materials, including fluids. Fluids include gases, vapors, liquids, and the like. Thus, a microfluidic channel generally has dimensions such that the length of the structure forms the greatest dimension, for example, a groove (an open shape) or channel (a structurally closed geometry). In certain variations, the microfluidic channels may be fully enclosed structures defining a void region that permits fluid communication there through, as described further herein. The microfluidic channels may have a variety of cross-sectional shapes, including circular, round, or oval (forming a tube or cylindrical shape), rectangular, and the like.

Detection systems 20 based on gas chromatography typically have at least five components: (1) a carrier gas supply 24; (2) a sample fluid injection system 26; (3) one or more gas chromatography columns 22; (4) a detector, such as the microfluidic PID 30; and (5) a data processing system (not shown). A carrier gas (also referred to as a mobile phase) is a high-purity and relatively inert gas, such as helium, hydrogen, nitrogen, argon, or air. The carrier gas may flow through the GC column 22 at the same time as the sample fluid to be tested (throughout the separating process). The sample fluid injection system 26 introduces a predetermined volume of the sample mixture comprising one or more target analytes to be tested (e.g., in gaseous form) into the column by combining it with the flowing carrier gas from a carrier gas supply. Typically, separation is achieved within the chromatographic column 22 because the internal surfaces of a column are coated (or the interior of the column is filled) with a material that serves as a stationary phase. The stationary phase adsorbs different target analytes in the sample mixture at differing degrees. The differences in adsorption cause differing delays and thus mobility rates for the different chemical species as they travel down the column, thereby effecting a physical separation of the target analytes in the sample mixture. Notably, while only shown as a single GC column 22, the gas chromatography (GC) unit 20 may comprise multiple columns through which the sample fluid may pass. Furthermore, such detection systems may include various other components, such as modulators and the like.

A detector, like the microfluidic PID 30, is located downstream from an outlet 32 of the one or more GC columns 22. The µPID 30 is integrated with the gas chromatography (GC) unit 20 and serves to detect the various chemicals or target analytes in the sample emerging or eluting from the column 22 at different times. The µPID 30 comprises a microfluidic ionization chamber 40 having an inlet 42 that receives the fluid sample and an outlet 44 through which the fluid sample exits the microfluidic ionization chamber 40. A first electrode and a distinct second electrode (not shown) are also in electrical communication with the microfluidic ionization chamber 40. A microfluidic ultraviolet radiation chamber 50 is configured to generate ultraviolet photons. A transmissive window 60 is disposed between the microfluidic ionization chamber 40 and the microfluidic ultraviolet radiation chamber 50 that permits the ultraviolet photons to pass from the microfluidic ultraviolet radiation chamber 40 into the microfluidic ionization chamber 50. The µPID 30 thus analyzes the sample processed in the gas chromatography (GC) unit 20. While not shown, a data processing system is also typically in communication with the µPID 30, to be able to store, process, and record the separation test results.

Figure 2:
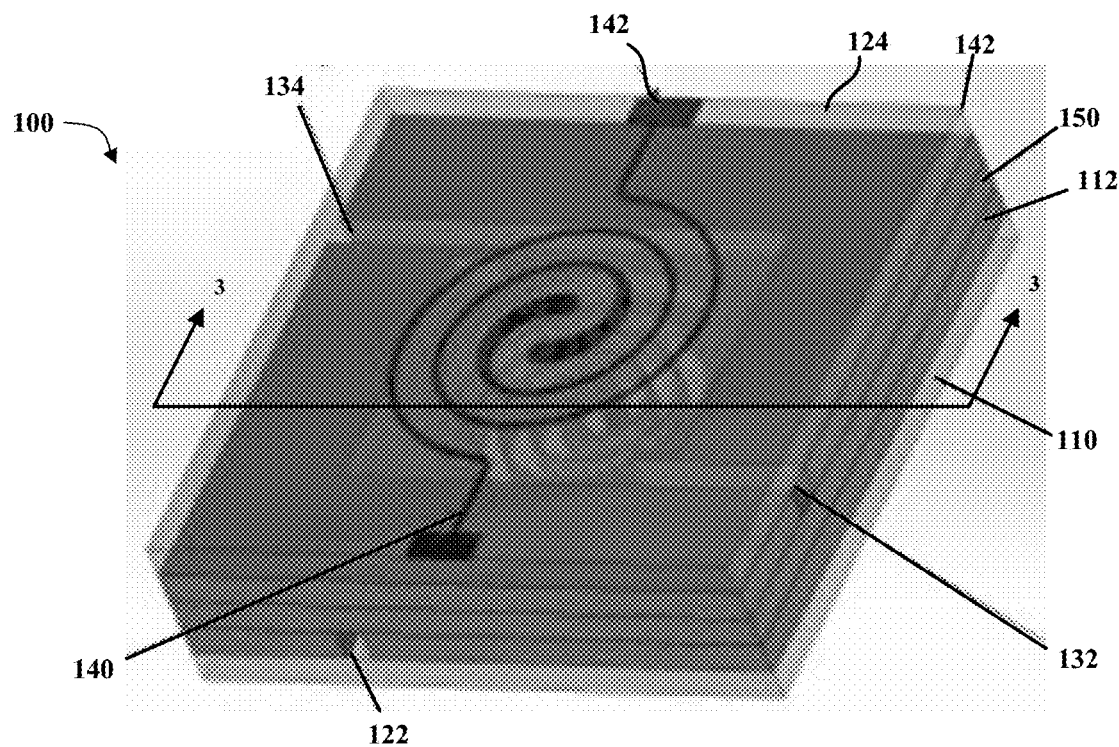
FIG. 2 shows an illustration of an integrated microfluidic photoionization detector (PID) having an ultrathin transmission window according to certain aspects of the present disclosure.
Figure 3:
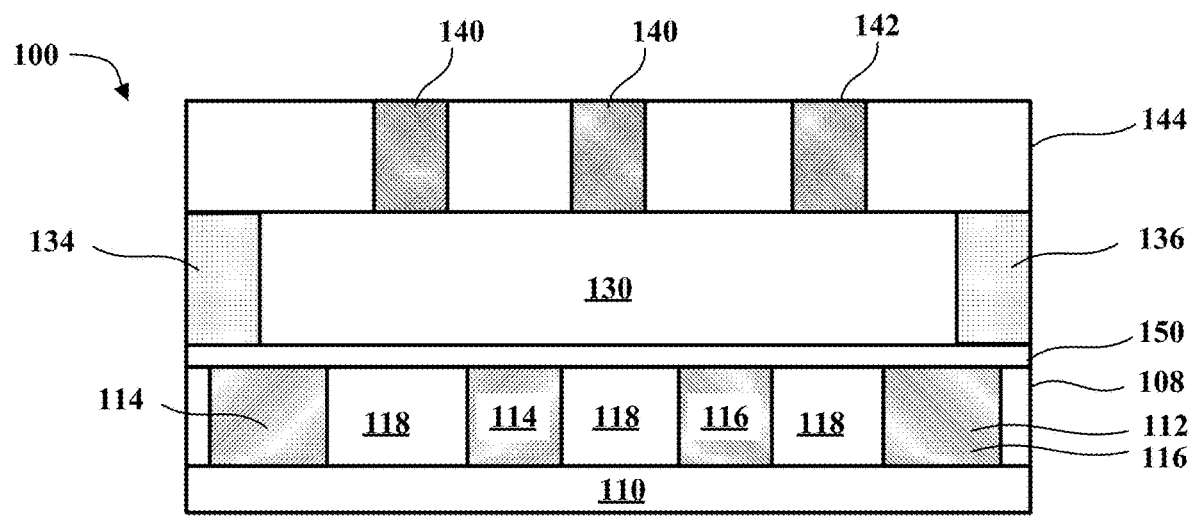
FIG. 3 is a cross-sectional view of the integrated microfluidic photoionization detector (PID) in FIG. 2 taken along line 3-3.

FIGS. 2 and 3 shows a schematic and cross-section of a representative integrated microfluidic photoionization detector (µPID) 100 prepared in accordance with certain aspects of the present disclosure. The µPID 100 includes a substrate 110. One or more microfluidic channels 118 can be formed in or on the substrate 110. In FIGS. 2 and 3, a wall structure 112 is formed on the substrate 110 to define one or more microfluidic channels 118. The substrate 110 may be formed of an inorganic material or a polymer. In certain aspects, the substrate 110 may be glass (e.g., silica or borosilicate). In certain variations, the substrate 110 comprises a plurality of layers.

In certain variations, the wall structure 112 may be a layer or select regions of electrically conductive material (e.g., a conductive silicon material) formed on the substrate 110. In this manner, in certain variations, when the wall structure 112 is electrically conductive, the wall structure 112 can serve as a positive electrode and/or a negative electrode. Thus, at least one layer of the wall structure 112 may comprise an electrically conductive material. The electrically conductive material may be formed of a conductive material or a semiconductor material (such as a doped semiconductor material). In certain aspects, the electrically conductive material comprises a material selected from the group consisting of: silicon (Si) (e.g., doped silicon), aluminum (Al), indium-tin-oxide (ITO), gold (Au), silver (Ag), platinum (Pt), iridium (Ir), palladium (Pd), tungsten (W), stainless steel (SS), zinc (Zn), titanium (Ti), their alloys and oxides and combinations thereof. At least two of the layers of the plurality may have distinct compositions. For example, a first layer on the substrate 110 may comprise a doped semiconductor material, such as doped silicon, and a second layer overlying the first layer may comprise an electrically conductive metal. Alternatively, electrically conductive materials can be embedded as electrodes in the wall structure 112 that are in contact with the one or more microfluidic channels 118.

The wall structure 112 can be selectively formed in certain regions or alternatively removed in select regions in a pattern that forms the one or more microfluidic channels 118. In certain aspects, the one or more microfluidic channels 118 can define a spiral pattern. The one or more microfluidic channels 118 may thus define a serpentine pattern on the substrate. By "serpentine," it is meant that the fluidic channel is a flow-through design that winds and has at least two 180° changes in direction through the course of the fluid path. The fluid pathway defined by the one or more microfluidic channels 118 is thus curved and may avoid changes in direction that result in dead zones or diminished fluid flow. Such a serpentine path may define a spiral structure or an interdigitated type structure. In one embodiment, the one or more microfluidic channels 118 may define an Archimedean spiral. The one or more microfluidic channels 118 may be etched or formed in a conductive silicon wafer or layer, for example, as an Archimedean spiral channel formed in such a material. In other variations, the one or more microfluidic channels may have other flow path configurations, including linear straight-line flow paths.

In certain variations, the one or more microfluidic channels 118 (or ionization chamber) has a total volume of less than or equal to about 10 µL. In certain preferred aspects, less than or equal to about 9 µL, optionally less than or equal to about 8 µL, optionally less than or equal to about 7 µL, optionally less than or equal to about 6 µL, optionally less than or equal to about 5 optionally less than or equal to about 4 µL, optionally less than or equal to about 3 µL, optionally less than or equal to about 2 and in certain variations, optionally less than or equal to about 1.5 µL. For example, in one variation, the one or more microfluidic channels 118 define an ionization chamber volume of only about 1.3 µL.

Furthermore, in certain aspects, the µPID 100 device has negligible total dead volume within the microfluidic channel pathway. The total dead volume of the one or more microfluidic channels 118 may be less than or equal to about 1% of a total volume of the microfluidic channel, for example, where a total volume of the one or more microfluidic channels is 5 µL, a dead volume of less than or equal to 1% would be a dead volume of less than or equal to about 0.05 µL or 50 nL. In certain other variations, the total dead volume of the one or more microfluidic channels 118 may be less than or equal to about 0.9% of a total volume of the one or more microfluidic channels, optionally less than or equal to about 0.7% of a total volume of the one or more microfluidic channels, optionally less than or equal to about 0.6% of a total volume of the one or more microfluidic channels, and in certain variations, less than or equal to about 0.5% of a total volume of the one or more microfluidic channels. In certain other variations, the dead volume of the one or more microfluidic channels may be less than or equal to about 30 nL, optionally less than or equal to about 25 nL, optionally less than or equal to about 15 nL, optionally less than or equal to about 10 nL, optionally less than or equal to about 5 nL, optionally less than or equal to about 4 nL, optionally less than or equal to about 3 nL, and in certain variations, optionally less than or equal to about 2 nL.

A microfluidic channel may have a width of greater than or equal to about 50 µm to less than or equal to about 200 µm, optionally greater than or equal to about 100 µm to less than or equal to about 200 µm, and in certain aspects, optionally greater than or equal to about 125 µm to less than or equal to about 175 µm. In certain other variations, the microfluidic channel has a height or depth of greater than or equal to about 100 µm to less than or equal to about 600 µm, optionally greater than or equal to about 200 µm to less than or equal to about 500 µm, optionally greater than or equal to about 300 µm to less than or equal to about 400 µm, and in certain aspects, optionally greater than or equal to about 350 µm to less than or equal to about 400 µm. A total length of the microfluidic channel may be greater than or equal to about 0.5 cm to less than or equal to about 10 cm, optionally greater than or equal to about 1 cm to less than or equal to about 5 cm, and in certain aspects, optionally greater than or equal to about 2 cm to less than or equal to about 3 cm. A thickness of a wall (e.g., between respective passes adjacent to one another in the microfluidic channels) may be greater than or equal to about 10 µm to less than or equal to about 100 µm, optionally greater than or equal to about 25 µm to less than or equal to about 75 µm, and in certain aspects, optionally greater than or equal to about 40 µm to less than or equal to about 60 µm. In one embodiment, a microfluidic channel has a cross section of 150 µm (width)×380 µm (depth), a wall thickness of 50 µm, and a length of 2.3 cm.

As noted above, the microfluidic photoionization detector (PID) 100 further includes a first electrode and a second electrode of opposite polarity. For example, the wall structure 112 may define a first electrode region 114 and a distinct second electrode region 116. The first electrode region 114 and the second electrode region 116 may be formed in select regions of the one or more layers of the wall structure 112 on the substrate 110. The wall structure 112 may have one or more non-conductive regions 108. In certain variations, the substrate 110 comprises select regions having a first layer of doped silicon and a second layer of electrically conductive metal, where the select regions are distinct regions that correspond to the respective first electrode region 114 and the second electrode region 116. The first electrode region 114 may be separated and electrically isolated from the second electrode region 116 by the one or more microfluidic channels 118. The microfluidic channel 118 may be formed in the wall structure 112 and thus separate and define the first electrode region 114 and the second electrode region 116. In certain aspects, a floor of the microfluidic channel 118 may be the substrate 110 or alternatively, while not shown, the one or more microfluidic channels may be formed entirely in the wall structure 112 so that the side walls and floor/bottom portion are defined therein.

The first electrode region 114 and the second electrode region 116 can be connected to an external positive and negative lead of a power source (not shown). While not shown, a power drive circuit connected to a power source can be connected to the first electrode region 114 and to the second electrode region 116 with opposite polarity. The first and second electrode regions 114, 116 may be connected to an amplifier (not shown) to form a closed circuit. In certain aspects, the power source may be a low voltage power source having a maximum voltage of less than or equal to about 20 volts direct current (VDC). The electrodes defined by the first electrode region 114 and second electrode region 116 thus provide the ability to measure electric signals generated by ionized analytes within the one or more microfluidic channels 118 as they are bombarded with and excited by photons.

The μPID 100 device also includes an inlet 122 to one or more microfluidic channels 118 that serve as a microfluidic ionization chamber. There is also an outlet 124 to the one or more microfluidic channels 118. Thus, a carrier gas containing one or more target analytes can exit a GC column and enter the inlet 122 where it travels through the one or more microfluidic channels 118. As discussed below, the analytes in the fluid flowing through the microfluidic ionization chamber (one or more microfluidic channels 118) can be ionized and the charge measured. The first electrode region 114 and second electrode region 116 can detect current generated by the target analyte(s) upon UV ionization. The fluid may then exit the microfluidic ionization chamber (one or more microfluidic channels 118) through the outlet 124.

The μPID 100 device also includes a source of electromagnetic radiation or light, which may be a microfluidic ultraviolet radiation chamber or microfluidic discharge chamber 130 that is configured to generate ultraviolet photons. The microfluidic discharge chamber 130 may have an inlet 132 and may be filled with an ultraviolet generating fluid such as, krypton, argon, helium, and other pure or mixed gases known in the art to generate UV light. In one aspect, the ultraviolet generating fluid may be selected from the group consisting of: krypton, argon, helium, and combinations thereof. The inlet 132 may be sealed after filling with the ultraviolet generating fluid. Alternatively, the microfluidic discharge chamber 130 may have an outlet 134, so that the ultraviolet generating fluid may flow into the inlet 132 and exit the microfluidic discharge chamber 130 via the outlet 134. The microfluidic discharge chamber 130 may also have a non-conductive cap 136 disposed at the terminal edges of the open chamber.

The integrated microfluidic discharge chamber 130 generates light or electromagnetic radiation within the integrated lamp and then photons, which are directed towards the contents of the one or more microfluidic channels 118. As shown, a first excitation electrode 140 and a second excitation electrode 142 of an opposite polarity are arranged in a pattern in a cover layer 144 that generally corresponds to the pattern of the one or more microfluidic channels 118 below. Thus, when current or potential is applied to the first excitation electrode 140 and the second excitation electrode 142, the ultraviolet generating fluid is excited and generates photons in the regions corresponding to the one or more microfluidic channels 118.

Particularly suitable light falls within the ultraviolet electromagnetic radiation spectrum. In certain variations, the light may be ultraviolet radiation (UV) (including ultraviolet A, ultraviolet B, ultraviolet C, near ultraviolet, middle ultraviolet, far ultraviolet, extreme ultraviolet, and vacuum ultraviolet) having a wavelength of greater than or equal to about 10 nm to less than or equal to about 400 nm. In still other variations, the light may be ultraviolet radiation in a range of greater than or equal to about 100 nm to less than or equal to about 400 nm (including ultraviolet A, ultraviolet B, ultraviolet C). Notably, the light may filtered light, focused light, polarized light, or may be extra-spectral or a mixture of different wavelengths.

In certain variations, as described further below, a UV transmission window may be ultrathin and thus in certain embodiments may have a sub-micron thickness. Thus, an ultrathin transmissive window 150 is disposed between the microfluidic ionization chamber in the form of the one or more microfluidic channels 118 and the microfluidic ultraviolet radiation chamber in the form of microfluidic discharge chamber 130. The ultrathin transmissive window 150 permits a sufficient amount of ultraviolet photons to pass from the microfluidic discharge chamber 130 into the one or more microfluidic channels 118 that serve as a microfluidic ionization chamber to excite one or more target analytes to a detectable level. In certain aspects, transmissive means that the ultrathin window is transparent for a target range of wavelengths of electromagnetic energy, for example, in the ultraviolet wavelength ranges discussed above. Thus, in certain aspects, a transmissive window transmits greater than or equal to about 5% of electromagnetic energy at the predetermined range of wavelengths, optionally of greater than or equal to about 10%, optionally greater than or equal to about 20%, optionally greater than or equal to about 30%, optionally greater than or equal to about 40%, optionally greater than or equal to about 50%, optionally greater than or equal to about 60%, optionally greater than or equal to about 70%, optionally greater than or equal to about 80%, optionally greater than or equal to about 90%, and in certain aspects, optionally greater than or equal to about 95% of the electromagnetic energy at the predetermined range of wavelengths (e.g., in the ultraviolet ranges of the spectrum). In certain variations, the transmissive ultrathin window has a thickness of less than or equal to about 20 μm and in configured to transmit greater than or equal to about 5% of the ultraviolet photons or any of the transmission levels of the ultraviolet photons specified above.

A thickness of the ultrathin transmission window 150 may be less than or equal to about 20 micrometer (μm), optionally less than or equal to about 10 μm, optionally less than or equal to about 5 μm, optionally less than or equal to about 4 μm, optionally less than or equal to about 3 μm, optionally less than or equal to about 2 μm, and in certain variations, optionally less than or equal to about 1 μm. In certain select variations, a thickness of the ultrathin transmission window 150 may be less than or equal to about 500 nm, optionally less than or equal to about 450 nm, optionally less than or equal to about 400 nm, optionally less than or equal to about 350 nm, optionally less than or equal to about 300 nm, optionally less than or equal to about 250 nm, optionally less than or equal to about 200 nm, optionally less than or equal to about 150 nm, optionally less than or equal to about 100 nm, and in certain variations, optionally less than or equal to about 50 nm. In certain variations, a thickness of the ultrathin transmission window 150 may be greater than or equal about 50 nm to less than or equal to about 20 μm, optionally greater than or equal about 50 nm to less than or equal to about 10 μm, optionally greater than or equal about 50 nm to less than or equal to about 5 μm, optionally greater than or equal about 50 nm to less than or equal to about 4 μm, optionally greater than or equal about 50 nm to less than or equal to about 3 μm, optionally greater than or equal about 50 nm to less than or equal to about 2 μm, optionally greater than or equal about 50 nm to less than or equal to about 1 μm, optionally greater than or equal about 50 nm to less than or equal to about 500 nm, optionally greater than or equal about 50 nm to less than or equal to about 250 nm, optionally greater than or equal about 50 nm to less than or equal to about 250 nm, optionally greater than or equal about 50 nm to less than or equal to about 200 nm, optionally greater than or equal about 50 nm to less than or equal to about 150 nm, and in certain variations, optionally greater than or equal about 50 nm to less than or equal to about 100 nm.

As discussed below, the ultrathin transmissive window 150 may be an ultrathin plate or may be one or more select ultrathin regions or layers defined in a thicker plate or layers of material. In certain aspects, the ultrathin transmissive window 150 may be disposed over the one or more microfluidic channels 118. In certain variations, the ultrathin transmissive window 150 is placed over at least a portion of the one or more microfluidic channels 118, thus forming an upper or top wall (e.g., a fourth side of a three-side channel) to enclose the microfluidic channel(s) 118. However, ultrathin transmissive window 150 need not contact the one or more microfluidic channels 118, but may instead be positioned near the microfluidic channel and leave a small gap, for example, positioned less than a few millimeters to less than about 10 μm away from the one or more microfluidic channels 118. Thus, the source of UV light in the form of the microfluidic discharge chamber 130 is positioned and configured to direct photons to the sample fluids that may be present within the one or more microfluidic channels. The one or more microfluidic channels 118 thus serve as an ionization chamber for the analyte compounds present and flowing within them.

Notably, in certain variations, the transmissive ultrathin window may be microfabricated from a material like silica that conventionally was deemed unsuitable for such an application, because such a material is considered to be non-transparent to UV radiation. Silica is known to have an extremely low transmission coefficient (or extremely high extinction coefficient) in the UV spectrum of interest (e.g., wavelengths of about 140 nm to about 70 nm, corresponding to a UV photon energy of 9 eV to 17.5 eV). Therefore, silica was not conventionally considered as a material that could be used as a UV transmission window for a PID device. However, when using certain microfabrication techniques described herein, silica can be formed as a portion of a transmission window, which has an ultrathin thickness, and therefore becomes transparent in the target UV spectrum. More specifically, a fraction of the transmitted UV photon flux is determined by $(1-A \times t)$, where A is the silica extinction coefficient and t is the transmission window thickness. Despite a large A, $A \times t$ becomes relatively small (meaning that it becomes UV transparent) when t is extremely thin (for example, when t is sub-micron in thickness). However, the present disclosure contemplates forming ultrathin transmission windows not only of silicon-containing materials, like silica (e.g., silicon dioxide), fused silica, silicon, but also of various other materials, such as magnesium fluoride ($MgF_2$), calcium fluoride ($CaF_2$), lithium fluoride (LiF), and the like. In certain variations, the transmissive ultrathin window comprises a material selected from the group consisting of: silica, fused silica, silicon, quartz, sapphire, magnesium fluoride, calcium fluoride, lithium fluoride, and combinations thereof.

In certain variations, to maintain mechanical integrity, the transmission window is designed as a plate having one or more select regions with an ultrathin thickness to permit transmission of UV electromagnetic radiation/photons, while remaining regions of the plate outside the one or more select regions can remain relatively thick, as they are non-transparent. The thicker non-transparent regions have a thickness greater than a thickness of the ultrathin transmissive region(s). In certain variations, a ratio of an average first thickness of an ultrathin transmissive region to an average second thickness of the remaining non-transparent thicker regions may be less than or equal to about 1:2, optionally less than or equal to about 1:3, optionally less than or equal to about 1:4, optionally less than or equal to about 1:5, and in certain variations, optionally less than or equal to about 1:5.

In certain variations, the thicker regions have a thickness of greater than about 500 nm, optionally greater than or equal to about 600 nm, optionally greater than or equal to about 700 nm, optionally greater than or equal to about 750 nm, optionally greater than or equal to about 800 nm, optionally greater than or equal to about 900 nm, optionally greater than or equal to about 1 μm, optionally greater than or equal to about 2 μm, optionally greater than or equal to about 3 μm, optionally greater than or equal to about 4 μm, optionally greater than or equal to about 5 μm, optionally greater than or equal to about 10 μm, and in certain variations, optionally greater than or equal to about 20 μm.

In other aspects, the transmission window may be an assembly including multiple layers, for example, one layer may be an ultrathin layer while another layer may be one or more thicker layers. Thus, the transmission window may be formed in a stack of layers comprising a first layer and a second layer. The transmissive ultrathin window is defined in the first layer and one or more regions of the second layer corresponding to the transmissive ultrathin window are absent. Hence, select regions of the one or more thicker layers may be removed to permit transmission of UV radiation through the ultrathin layer in the select regions. The removal may be achieved by nanopatterning, etching, lithographic or photolithographic techniques. In certain aspects, the material forming the transmission window may be those that can be processed via such lithographic, photolithographic, or nanomanufacturing techniques, like silica, silicon, quartz, fused quartz, and the like.

Figure 4:
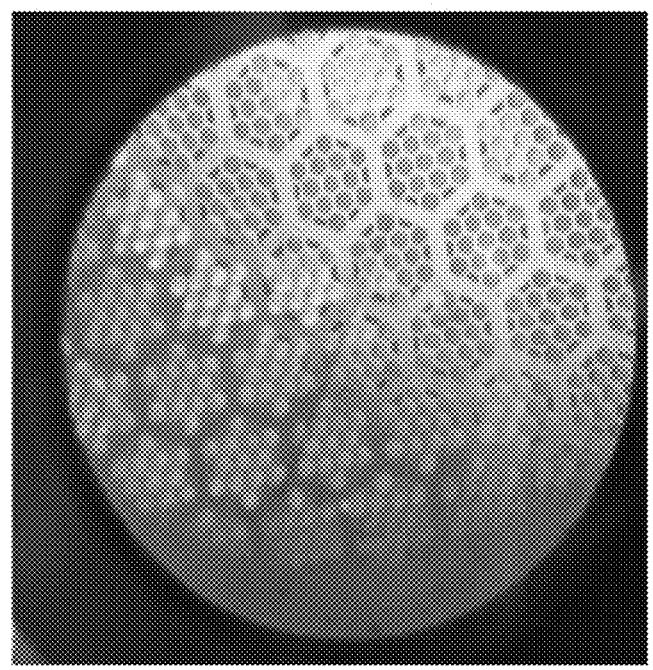
FIG. 4 is a photograph of an ultrathin ultraviolet (UV) transmission window patterned on a thermal oxide coated silicon wafer.

FIG. 4 shows a picture of an ultrathin transmissive window made in accordance with certain aspects of the present disclosure. A sub-micron (e.g., 500 nm) thick silica UV transmission window is formed on a silicon wafer having a thermal oxide coating. Thermal oxidation occurs after exposing a silicon wafer to a combination of oxidizing agents (and optionally heat) to create a thermal oxide layer comprising silicon dioxide ($SiO_2$) or silica. In order to maintain its mechanical integrity, a transmissive window comprising silica can be designed such that some portions are extremely thin (e.g., thicknesses of less than or equal to about 500 nm), whereas the remaining portions can remain relatively thick. To ensure the mechanical strength, a periodic small open area pattern is created and etched from the silicon side (i.e., a side opposite side having the coating of the thermal oxide). The thermal oxide layer (i.e., silica layer) serves as an etching stop layer. The silica transmission window thickness is controlled by the thermal oxide layer on the silicon wafer. Thus, the etch pattern creates a pattern of select regions of the silica that define a transmission window for the UV radiation/photons. Such transmissive windows can be formed with standard photolithographic methods in cleanroom, by way of non-limiting example.

EXAMPLES

Testing of the UV transmission capability of the ultrathin silica window. In this study, a UV lamp used on a conventional PID is purchased from Baseline-Mocon and used as the UV source (UV photon energy 10.6 eV, wavelength approximately 120 nm). The lamp is placed directly on top of an ultrathin silica UV transmission window formed in accordance with certain aspects of the present disclosure.

Figure 5:
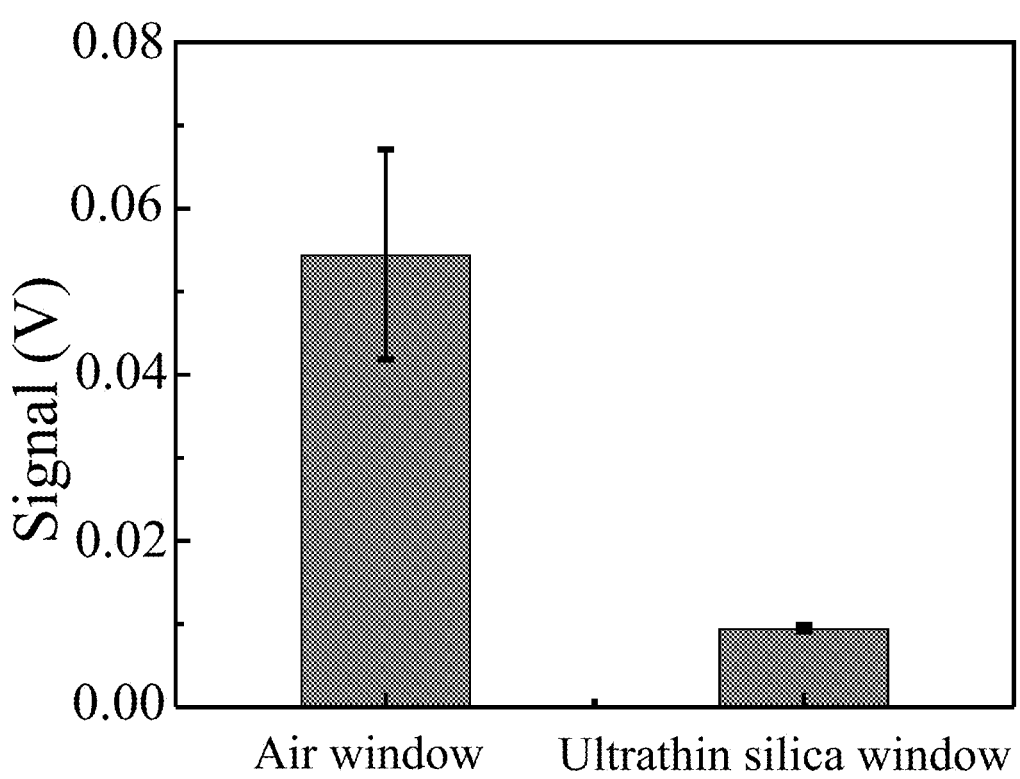
FIG. 5 is a graph comparing the UV transmission capability of an ultrathin ultraviolet (UV) transmission window prepared in accordance with certain aspects of the present disclosure as compared to an air window.

Toluene is used as the analyte and is flowed through the microfluidic ionization chamber below the silica window. A signal of ~0.01 V (bar on the right in FIG. 5) is obtained. For comparison, in the bar on the left in FIG. 5, the silica window is replaced with a silicon wafer having an air-window (meaning that a portion of the silicon wafer is completely etched through) of the same UV transmission area as the silica window. A signal of 0.05 V is obtained under otherwise the same testing conditions as for the silica window. The above comparison shows that the ultrathin silica window can transmit the UV light efficiently.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. An integrated microfluidic photoionization detector (PID) comprising:
   a microfluidic ionization chamber having an inlet that receives a fluid sample and an outlet through which the fluid sample exits the microfluidic ionization chamber;
   a first electrode and a distinct second electrode in electrical communication with the microfluidic ionization chamber;
   an integrated microfluidic ultraviolet radiation chamber that is configured to generate ultraviolet photons; and
   a transmissive window disposed between the microfluidic ionization chamber and the microfluidic ultraviolet radiation chamber, the transmissive window defining one or more ultrathin transmissive regions having a thickness of less than or equal to about 500 nm that permit the ultraviolet photons to pass from the microfluidic ultraviolet radiation chamber into the microfluidic ionization chamber.

2. The integrated microfluidic photoionization detector (PID) of claim 1, wherein the transmissive window comprises a material selected from the group consisting of: silica, fused silica, silicon, quartz, sapphire, magnesium fluoride, calcium fluoride, lithium fluoride, and combinations thereof.

3. The integrated microfluidic photoionization detector (PID) of claim 1, wherein the one or more ultrathin transmissive regions are defined as one or more select regions on a plate.

4. The integrated microfluidic photoionization detector (PID) of claim 1, wherein the transmissive window is disposed on a support plate and the one or more ultrathin transmissive regions are defined within select regions of the support plate.

5. The integrated microfluidic photoionization detector (PID) of claim 1, wherein the transmissive window further comprises a stack of layers comprising a first layer and a second layer, wherein the one or more ultrathin transmissive regions are defined within the first layer where the second layer is absent.

6. The integrated microfluidic photoionization detector (PID) of claim 1, wherein the one or more transmissive regions are configured to transmit greater than or equal to about 5% of the ultraviolet photons.

7. The integrated microfluidic photoionization detector (PID) of claim 1, wherein the one or more ultrathin transmissive regions have a thickness of greater than or equal to about 250 nm to less than or equal to about 500 nm.

8. The integrated microfluidic photoionization detector (PID) of claim 1, wherein the microfluidic ultraviolet radiation chamber has an inlet that receives an ultraviolet generating fluid.

9. The integrated microfluidic photoionization detector (PID) of claim 1, wherein the microfluidic ultraviolet radiation chamber comprises an ultraviolet generating fluid selected from the group consisting of: krypton, argon, helium, and combinations thereof.

10. The integrated microfluidic photoionization detector (PID) of claim 1, wherein the microfluidic ionization chamber is one or more microfluidic channels.

11. The integrated microfluidic photoionization detector (PID) of claim 10, wherein a total volume of the microfluidic ionization chamber is less than or equal to about 10 microliters and a total volume of the integrated microfluidic ultraviolet radiation chamber is less than or equal to about 10 microliters.

12. The integrated microfluidic photoionization detector (PID) of claim 1, wherein the first electrode and the distinct second electrode are formed in a layer of electrically conductive material and the one or more microfluidic channels are disposed in the layer to electrically insulate the first electrode from the second distinct electrode.

13. A detection system for one or more VOC analytes comprising:
   (i) a gas chromatography (GC) unit that comprises at least one gas chromatography column; and
   (ii) an integrated microfluidic photoionization detector (PID) disposed downstream of the gas chromatography (GC) unit that comprises:
      a microfluidic ionization chamber having an inlet that receives a fluid sample and an outlet through which the fluid sample exits the microfluidic ionization chamber;
      a first electrode and a distinct second electrode in electrical communication with the microfluidic ionization chamber;
      an integrated microfluidic ultraviolet radiation chamber that is configured to generate ultraviolet photons; and
      a transmissive window disposed between the microfluidic ionization chamber and the microfluidic ultraviolet radiation chamber, the transmissive window defining one or more ultrathin transmissive regions having a thickness of less than or equal to about 500 nm that permit the ultraviolet photons to pass from the microfluidic ultraviolet radiation chamber into the microfluidic ionization chamber, wherein the microfluidic photoionization detector (PID) analyzes a sample processed in the gas chromatography (GC) unit.

14. The detection system of claim 13, wherein the transmissive window comprises a material selected from the group consisting of: silica, fused silica, quartz, silicon, sapphire, magnesium fluoride, calcium fluoride, lithium fluoride, and combinations thereof.

15. The detection system of claim 13, wherein the one or more transmissive ultrathin regions are defined on a plate.

16. The detection system of claim 13, wherein the transmissive window is disposed on a support plate and the one or more transmissive ultrathin regions are is defined within select regions of the support plate.

17. The detection system of claim 13, wherein the transmissive window of the integrated microfluidic photoionization detector (PID) further comprises a stack of layers comprising a first layer and a second layer, wherein the one or more transmissive ultrathin transmissive windows are defined within the first layer where the second layer is absent.

18. The detection system of claim 13, wherein the one or more transmissive regions are configured to transmit greater than or equal to about 5% of the ultraviolet photons.

19. The detection system of claim 13, wherein the microfluidic ionization chamber defines one or more microfluidic channels and the first electrode and the distinct second electrode are formed in a layer of electrically conductive material, wherein the one or more microfluidic channels are disposed in the layer to electrically insulate the first electrode from the second distinct electrode.

20. An integrated microfluidic photoionization detector (PID) comprising:

a microfluidic ionization chamber having an inlet that receives a fluid sample and an outlet through which the fluid sample exits the microfluidic ionization chamber, wherein the microfluidic ionization chamber comprises one or more microfluidic channels that define a first pattern;

a first electrode and a distinct second electrode in electrical communication with the microfluidic ionization chamber;

an integrated microfluidic ultraviolet radiation chamber that is configured to generate ultraviolet photons;

a third electrode and a fourth electrode disposed over and in electrical communication with the microfluidic ultraviolet radiation chamber, wherein the third electrode and the fourth electrode define a second pattern that corresponds to the first pattern of the one or more microfluidic channels of the microfluidic ionization chamber disposed below the microfluidic ultraviolet radiation chamber; and a transmissive window disposed between the microfluidic ionization chamber and a first side of the microfluidic ultraviolet radiation chamber, the transmissive window defining one or more ultrathin transmissive regions having a thickness of less than or equal to about 500 nm that permit the ultraviolet photons to pass from the microfluidic ultraviolet radiation chamber into the microfluidic ionization chamber.

\* \* \* \* \*

UNITED STATES PATENT AND TRADEMARK OFFICE
CERTIFICATE OF CORRECTION

PATENT NO. : 12,038,408 B2
APPLICATION NO. : 17/282671
DATED : July 16, 2024
INVENTOR(S) : Xudong Fan et al.

Page 1 of 1

It is certified that error appears in the above-identified patent and that said Letters Patent is hereby corrected as shown below:

In the Claims

At Column 16, Claim number 16, Line number 66, before "defined", delete "is".

Signed and Sealed this
Eleventh Day of February, 2025

Coke Morgan Stewart
*Acting Director of the United States Patent and Trademark Office*